United States Patent
Dong et al.

(10) Patent No.: US 9,902,626 B2
(45) Date of Patent: Feb. 27, 2018

(54) METHOD AND FILTER FOR REMOVING NITRATE IONS

(71) Applicant: General Electric Company, Schenectady, NY (US)

(72) Inventors: Hongchen Dong, Niskayuna, NY (US); Larry Neil Lewis, Scotia, NY (US); Stephen Robert Vasconcellos, Doylestown, PA (US)

(73) Assignee: General Electric Company, Schenectady, NY (US)

( * ) Notice: Subject to any disclaimer, the term of this patent is extended or adjusted under 35 U.S.C. 154(b) by 552 days.

(21) Appl. No.: 13/951,651

(22) Filed: Jul. 26, 2013

(65) Prior Publication Data

US 2015/0027949 A1   Jan. 29, 2015

(51) Int. Cl.
| | |
|---|---|
| *C02F 1/00* | (2006.01) |
| *C08G 73/02* | (2006.01) |
| *C02F 1/28* | (2006.01) |
| *C02F 1/44* | (2006.01) |
| *C02F 101/16* | (2006.01) |

(52) U.S. Cl.
CPC .......... *C02F 1/285* (2013.01); *C08G 73/0206* (2013.01); *C08G 73/0226* (2013.01); *C02F 1/444* (2013.01); *C02F 2101/163* (2013.01)

(58) Field of Classification Search
CPC .... C02F 1/00; C02F 1/28; C02F 1/285; C02F 1/286; C02F 1/288; C02F 1/42; C02F 1/58; C02F 2101/163; C08G 73/02
USPC ....... 210/660, 638, 681, 683, 767, 807, 791, 210/500.37, 502.1, 506
See application file for complete search history.

(56) References Cited

U.S. PATENT DOCUMENTS

| | | | |
|---|---|---|---|
| 2,723,245 A * | 11/1955 | Wheaton ................. | B01J 49/07 210/670 |
| 3,983,222 A | 9/1976 | Lehto | |
| 4,479,877 A | 10/1984 | Guter | |
| 4,872,989 A | 10/1989 | Pirotta | |
| 5,015,456 A | 5/1991 | Verbueken et al. | |
| 5,679,229 A | 10/1997 | Goldstein et al. | |
| 6,534,554 B1 | 3/2003 | Mitchell et al. | |
| 7,470,369 B2 | 12/2008 | Diallo | |
| 8,277,664 B2 | 10/2012 | Frechet et al. | |
| 2009/0223896 A1 | 9/2009 | Diallo | |
| 2010/0181257 A1 | 7/2010 | Frechet et al. | |
| 2011/0186522 A1 | 8/2011 | Martin | |
| 2011/0315636 A1 * | 12/2011 | Diallo ................... | B01J 41/125 210/702 |
| 2012/0061321 A1 * | 3/2012 | Soane ..................... | C02F 1/56 210/666 |

FOREIGN PATENT DOCUMENTS

| | | |
|---|---|---|
| WO | 1999040990 A1 | 8/1999 |
| WO | 2010040117 A2 | 4/2010 |

OTHER PUBLICATIONS

Berbar et al. (Procedia Engineering, 2012).*
Zhu et al. (Desalination, 193(2006) 350-360).*
Zhu et al.,"Nitrate Removal from Contaminated Water Using Polyelectrolyte-Enhanced Ultrafiltration", ICOM International Congress on Membranes and Membrane Processes, Desalination 193, 2006, vol. 193, Issue 1-3, pp. 350-360.

\* cited by examiner

*Primary Examiner* — Allison G Fitzsimmons

(74) *Attorney, Agent, or Firm* — Wegman, Hessler & Vanderburg

(57) ABSTRACT

A method for removing nitrate ions from a solution is presented. The method includes providing a polymer comprising a protonated amine moiety and an anion derived from an acid having a pKa value greater than about 1. The method further includes contacting the polymer with the solution to bind at least a portion of the nitrate ions in the solution with the polymer, and form a polymer-nitrate complex. The method furthermore includes separating at least a portion of the polymer-nitrate complex from the solution.

12 Claims, No Drawings

METHOD AND FILTER FOR REMOVING NITRATE IONS

BACKGROUND

The invention generally relates to methods and filters for removing nitrate ions from a solution. More particularly, the invention relates to methods and filters for removing nitrate ions from a solution using a polymer including a protonated amine.

Nitrate ($NO_3^-$) contamination in surface water and groundwater has become a concern on a global scale since it poses a threat to drinking water supplies and promoting eutrophication. High nitrate concentration in drinking water sources can lead to a potential risk to public health, which could result in many diseases, such as birth defects, spontaneous abortion, increased infant mortality, diarrhea, abdominal pain, vomiting, diabetes, hypertension, respiratory tract infections, changes in the immune system, and methemoglobinemia. Therefore, the World Health Organization (WHO) established the limit for nitrate in drinking water to 10 mg $NO_3^-$-N/L. Nitrate contaminated water therefore has to be treated to meet the applicable regulation.

The technologies commonly used to remove or reduce $NO_3^-$ in water treatment processes include chemical denitrification with zero-valent iron, ion exchange, reverse osmosis, electrodialysis, and biological denitrification. However, these current available technologies may not be cost-effective and may generate additional by-products.

Thus, there is a need for more efficient methods and filters to remove nitrate ions from water.

BRIEF DESCRIPTION OF THE INVENTION

Embodiments of the present invention are included to meet these and other needs. One embodiment is a method for removing nitrate ions from a solution. The method includes providing a polymer comprising a protonated amine moiety and an anion derived from an acid having a pKa value greater than about 1. The method further includes contacting the polymer with the solution to bind at least a portion of the nitrate ions in the solution with the polymer, and form a polymer-nitrate complex. The method furthermore includes separating at least a portion of the polymer-nitrate complex from the solution.

One embodiment is a method for removing nitrate ions from a solution. The method includes providing a polymer comprising a protonated amine moiety and an anion derived from an acid having a pKa value greater than about 1. The method further includes contacting the polymer with the solution to bind at least a portion of the nitrate ions in the solution with the polymer, and form a polymer-nitrate complex. The method furthermore includes separating at least a portion of the polymer-nitrate complex from the solution, and separating at least a portion of nitrate ions from the polymer-nitrate complex to form a regenerated polymer.

One embodiment is a filter for removing nitrate ions from a solution. The filter includes a polymer comprising a protonated amine moiety and an anion derived from an acid having a pKa value greater than about 1.

DETAILED DESCRIPTION

As discussed in detail below, some of the embodiments of the invention include methods and filters for removing nitrate ions from a solution.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components (for example, a layer) being present and includes instances in which a combination of the referenced components may be present, unless the context clearly dictates otherwise.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical, which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis (4-phen-1-yloxy) (i.e., —OPhC($CF_3$)$_2$PhO—), 4-chloromethylphen-1-yl, 3-trifluorovinyl-2-thienyl, 3-trichloromethylphen-1-yl (i.e., 3-$CCl_3$Ph-), 4-(3-bromoprop-1-yl)phen-1-yl (i.e., 4-$BrCH_2CH_2CH_2$Ph-), and the like. Further examples of aromatic radicals include 4-allyloxyphen-1-oxy, 4-aminophen-1-yl (i.e., 4-$H_2$NPh-), 3-amino carbonylphen-1-yl (i.e., $NH_2$COPh-), 4-benzoylphen-1-yl, dicyanomethylidenebis (4-phen-1-yloxy) (i.e., —OPhC(CN)$_2$PhO—), 3-methylphen-1-yl, methylenebis (4-phen-1-yloxy) (i.e., —OPhCH$_2$PhO—), 2-ethylphen-1- yl, phenylethenyl, 3-formyl-2-thienyl, 2-hexyl-5-furanyl, hexamethylene-1,6-bis(4-phen-1-yloxy) (i.e., —OPh($CH_2$)$_6$PhO—), 4-hydroxymethylphen-1-yl (i.e., 4-HOC$H_2$Ph-), 4-mercaptomethylphen-1-yl (i.e., 4-HSC$H_2$Ph-), 4-methylthiophen-1-yl (i.e., 4-C$H_3$SPh-), 3-methoxyphen-1-yl, 2-methoxycarbonylphen-1-yloxy (e.g., methyl salicyl), 2-nitromethylphen-1-yl (i.e., 2-N$O_2$C$H_2$Ph), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms, which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis (cyclohex-4-yl) (i.e., —$C_6H_{10}C(CF_3)_2C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., C$H_3$CHBrC$H_2$C$_6H_{10}$O—), and the like. Further examples of cycloaliphatic radicals include 4-allyloxycyclohex-1-yl, 4-aminocyclohex-1-yl (i.e., $H_2NC_6H_{10}$—), 4-aminocarbonylcyclopent-1-yl (i.e., $NH_2COC_5H_8$—), 4-acetyloxycyclohex-1-yl, 2,2-dicyanoisopropylidenebis(cyclohex-4-yloxy) (i.e., —$OC_6H_{10}C(CN)_2C_6H_{10}$O—), 3-methylcyclohex-1-yl, methylenebis(cyclohex-4-yloxy) (i.e., —$OC_6H_{10}CH_2C_6H_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —$OC_6H_{10}(CH_2)_6C_6H_{10}$O—), 4-hydroxymethylcyclohex-1-yl (i.e., 4-HOC$H_2$C$_6H_{10}$—), 4-mercaptomethylcyclohex-1-yl (i.e., 4-HSC$H_2$C$_6H_{10}$—), 4-methylthiocyclohex-1-yl (i.e., 4-C$H_3$SC$_6H_{10}$—), 4-methoxycyclohex-1-yl, 2-methoxycarbonylcyclohex-1-yloxy (2-C$H_3$OCOC$_6H_{10}$O—), 4-nitromethylcyclohex-1-yl (i.e., N$O_2$C$H_2$C$_6H_{10}$—), 3-trimethylsilylcyclohex-1-yl, 2-t-butyldimethylsilylcyclopent-1-yl, 4-trimethoxysilylethylcyclohex-1-yl (e.g., (C$H_3$O)$_3$SiC$H_2$C$H_2$C$_6H_{10}$—), 4-vinylcyclohexen-1-yl, vinylidenebis (cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —C$H_2$CHBrC$H_2$—), and the like. Further examples of aliphatic radicals include allyl, aminocarbonyl (i.e., —CON$H_2$), carbonyl, 2,2-dicyanoisopropylidene (i.e., —C$H_2$C(CN)$_2$C$H_2$—), methyl (i.e., —C$H_3$), methylene (i.e., —C$H_2$—), ethyl, ethylene, formyl (i.e., —CHO), hexyl, hexamethylene, hydroxymethyl (i.e., —C$H_2$OH), mercaptomethyl (i.e., —C$H_2$SH), methylthio (i.e., —SC$H_3$), methylthiomethyl (i.e., —C$H_2$SC$H_3$), methoxy, methoxycarbonyl (i.e., C$H_3$OCO—), nitromethyl (i.e., —C$H_2$N$O_2$), thiocarbonyl, trimethylsilyl (i.e., (C$H_3$)$_3$Si—), t-butyldimethylsilyl, 3-trimethyoxysilylpropyl (i.e., (C$H_3$O)$_3$SiC$H_2$C$H_2$C$H_2$—), vinyl, vinylidene, and the like. By way of further example, a $C_1$-$C_{10}$ aliphatic radical contains at least one but no more than 10 carbon atoms. A methyl group (i.e., C$H_3$—) is an example of a $C_1$ aliphatic radical. A decyl group (i.e., C$H_3$(C$H_2$)$_9$—) is an example of a $C_{10}$ aliphatic radical.

As discussed in detail below, some embodiments of the invention are directed to a method for removing nitrate ions from a solution. The method includes providing a polymer comprising a protonated amine moiety and an anion derived from an acid having a pKa value greater than about 1. The method further includes contacting the polymer with the solution to bind at least a portion of the nitrate ions in the solution with the polymer, and form a polymer-nitrate complex. The method furthermore includes separating at least a portion of the polymer-nitrate complex from the solution.

The term "protonated amine moiety" as used herein refers to an amine moiety including a proton or a hydrogen atom such that the amine moiety is positively charged. The polymer may include a primary protonated amine moiety (e.g., RN$H_3^+$), a secondary protonated amine moiety (e.g., R$_2$N$H_2^+$), a tertiary protonated amine moiety (e.g., R$_3$N$H^+$), or combinations thereof, wherein R is a $C_1$-$C_{12}$ aliphatic radical, a $C_3$-$C_{12}$ cycloaliphatic radical, or a $C_3$-$C_{12}$ aromatic radical.

The polymer may be linear or branched. Further, the polymer may include an aliphatic amine moiety, an aromatic amine moiety, a cycloaliphatic amine moiety, or combinations thereof. In some embodiments, the polymer includes a protonated poly(vinyl amine), a protonated poly(4-vinyl pyridine), a protonated polyethyleneimine, a protonated poly(2-(dimethylamino)ethyl methacrylate), a protonated poly(amido amine) dendrimer, or combinations thereof. Structural formulas for some examples of suitable polymers are illustrated in FIGS. 1-4.

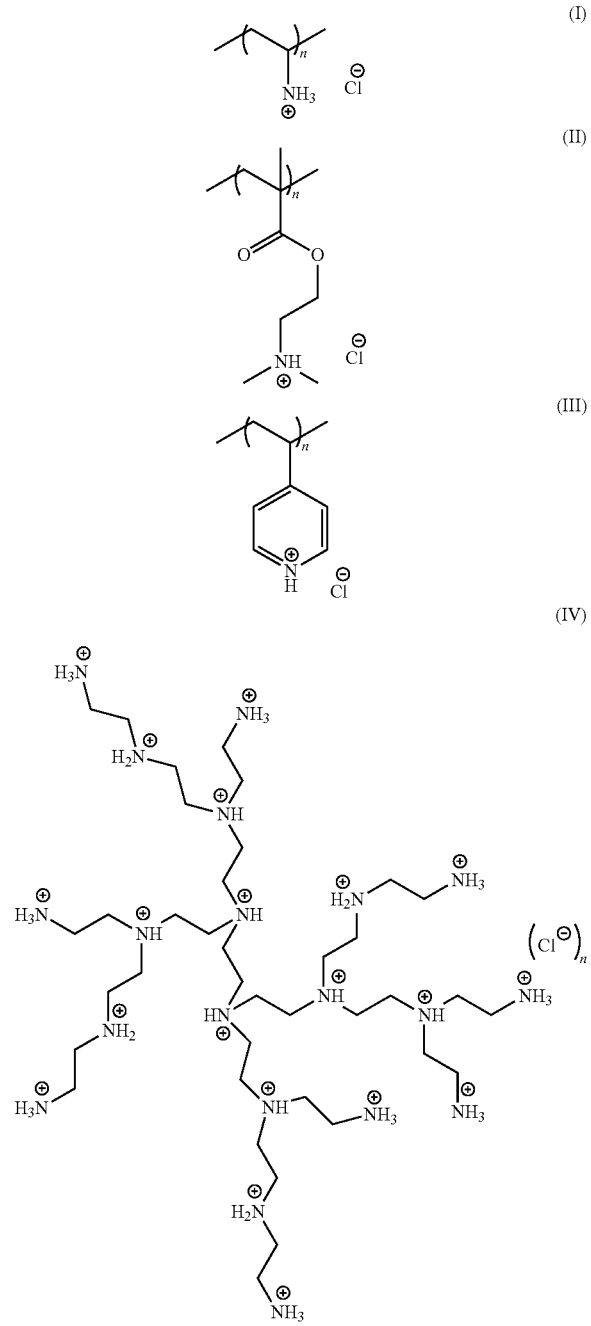

In certain embodiments, the polymer includes a protonated polyalkyleneimine. Suitable non-limiting examples of protonated polyalkyleneimines include protonated polyethyleneimine, protonated polypropyleneimine, protonated polybutyleneimine, protonated polypentyleneimine, or combinations thereof.

In some embodiments, the polymer comprises a protonated polyethyleneimine. Further, the protonated polyethyleneimine may be linear or branched. In certain embodiments, the polymer includes a branched protonated polyethyleneimine. The branched polyethyleneimine may include at least one primary protonated amine moiety, at least one secondary protonated amine moiety, and at least one tertiary protonated amine moiety. In some embodiments, the branched polyethyleneimine includes 15% to 25% primary amine moieties, 20% to 50% secondary amine moieties, and 10% to 25% tertiary amine moieties.

As noted earlier, the polymer further includes an anion. As will be appreciated by one of ordinary skill in the art, the polymer may be formed by forming a salt of an amine group with an acid such that the polymer includes a protonated amine moiety and an anion. In some embodiments, the anion is derived from an acid having a pKa value greater than about 4.

The term "pKa" as used herein refers to the negative base-10 logarithm of the acid dissociation constant of an acid in solution. For polyprotic acids (for example, sulfuric acid and phosphoric acid) the term "pKa" as used herein refers to the dissociation of the first proton. The larger the value of $pK_a$, the smaller the extent of dissociation at any given pH. A weak acid has a $pK_a$ value in the approximate range −2 to 12 in water. Acids with a $pK_a$ value of less than about −1.74 are said to be strong acids (such as, for example, hydrochloric acid, hydrobromic acid, sulfuric acid). The term "strong acid" may further refer to an acid that ionizes completely in an aqueous solution by losing one proton; and the term "weak acid" refers to an acid that does not dissociate completely.

Suitable anions may be derived from any acid having a pKa value greater than 1. In some embodiments, the anion is derived from an acid having a pKa value greater than 2. In certain embodiments, the anion is derived from an acid having a pKa value greater than 4.

In some embodiments, the anion is derived from an acid selected from the group consisting of acetic acid, propionic acid, butyric acid, chloroacetic acid, lactic acid, glycolic acid, oxalic acid, malonic acid, phosphoric acid, citric acid, benzoic acid, ascorbic acid, phthalic acid, maleic acid, or combinations thereof. In certain embodiments, the anion is an acetate ion.

The polymer may have a molecular weight depending on its end-use form for separation of the nitrate ions. In some embodiments, the polymer has a molecular weight in a range from about $10^3$ g/mole to about $10^6$ g/mole. In some embodiments, the polymer has a molecular weight in a range from about $10^4$ g/mole to about $10^5$ g/mole.

The polymer may have any suitable form depending on the end-use application. Suitable non-limiting examples include a membrane, a solution, a mixture, a cross-linked gel, an immobilized substrate, a film, a fiber, a powder, a bead, a pellet, or combinations thereof.

In applications wherein the nitrate ions are removed from water, the solution may be an aqueous solution. In some embodiments, the solution may include water and other optional components, such as, salts, other anions, organic compounds, or combinations thereof. In some instances, the polymer may be water soluble. In other instances, the polymer may be water-insoluble, and may be used in the above method in a suitable form such that it contacts the aqueous solution and form the polymer-nitrate complex.

In some other embodiments, the solution may be a non-aqueous solution, such that the method might be useful for the purification of non-aqueous solutions, such as, organic chemical wastes, nuclear wastes in non-aqueous solvents, or other non-aqueous solutions containing nitrate ions. A polymer that is soluble in the non-aqueous solution may be used to remove the nitrate ions, in such instances.

As noted earlier, the method further includes contacting the polymer with the solution to bind at least a portion of the nitrate ions in the solution with the polymer, and form a polymer-nitrate complex. The step of contacting may depend on the polymer form and the type of solution. Thus, by of example, in some embodiments, the polymer may be immobilized on a support and the solution may be contacted with the polymer by continuous flow of the solution across the support. In some other examples, the polymer may be in the form of a solution and the step of contacting may include mixing the polymer solution with the solution containing the nitrate ions. The step of contacting may be further performed under conditions (for example, pH, temperature, amine concentration) effective to bind at least a portion of the nitrate ions in the solution to the polymer.

In some embodiments, at least about 40 weight percent of the nitrate ions in the solution bind to the polymer to form a polymer-nitrate complex. In some embodiments, the weight fraction of the nitrate ions that bind to the polymer to form a polymer-nitrate complex is in a range from about 50 weight percent to about 99 weight percent of the total amount of nitrate ions in the solution. In some embodiments, the weight fraction of the nitrate ions that bind to the polymer to form a polymer-nitrate complex is in a range from about 60 weight percent to about 90 weight percent of the total amount of nitrate ions in the solution.

The method furthermore includes separating at least a portion of the polymer-nitrate complex from the solution. Any suitable technique may be employed to remove the polymer-nitrate complex from the solution. In certain embodiments, the polymer-nitrate complex may be removed using a filtration membrane, for example, an ultrafiltration membrane.

The filtration process may be driven by pressure, vacuum, or gravity. If pressure is used, it may be applied to the side of the membrane containing the polymer-nitrate complex to increase the flow of filtrate through the membrane. Pressure may be generated by the addition of gas pressure, or may be mechanically applied. A vacuum may be applied to the side of the membrane opposite of the polymer-nitrate complex side, to increase the flow rate from the other side of the membrane. Filtration may also occur by simple gravity. In addition, combinations of pressure, vacuum, and gravity may be used.

The method may further include separating at least a portion of the nitrate ions from the polymer-nitrate complex to form a regenerated polymer. In one embodiment, the polymer-nitrate complex may be introduced into a basic aqueous environment where protonated amines get deprotonated, and wherein conditions are such that the nitrate ions separate from the polymer. In some such embodiments, the regenerated polymer may be recycled and used for contacting the solution again.

A filter for removing nitrate ions from a solution is also presented. The filter may be in the form of a membrane, a cross-linked gel, an immobilized substrate, a film, a fiber, a powder, a bead, a pellet or combinations thereof.

The filter includes a polymer comprising a protonated amine moiety and an anion derived from an acid having a pKa value greater than about 1. The polymer may include a primary protonated amine moiety (e.g., $RNH_3^+$), a secondary protonated amine moiety (e.g., $R_2NH_2^+$), a tertiary protonated amine moiety (e.g., $R_3NH^+$), or combinations thereof, wherein R is a $C_1$-$C_{12}$ aliphatic radical, a $C_3$-$C_{12}$ cycloaliphatic radical, or a $C_3$-$C_{12}$ aromatic radical.

The polymer may be linear or branched. Further, the polymer may include an aliphatic amine moiety, an aromatic amine moiety, a cycloaliphatic amine moiety, or combinations thereof. In some embodiments, the polymer includes a protonated poly(vinyl amine), a protonated poly(4-vinyl pyridine), a protonated polyethyleneimine, a protonated poly(2-(dimethylamino)ethyl methacrylate), a protonated poly(amido amine) dendrimer, or combinations thereof.

In certain embodiments, the polymer includes a protonated polyalkyleneimine. Suitable non-limiting examples of protonated polyalkyleneimines include protonated polyethyleneimine, protonated polypropyleneimine, protonated polybutyleneimine, protonated polypentyleneimine, or combinations thereof.

In some embodiments, the polymer comprises a protonated polyethyleneimine. Further, the protonated polyethyleneimine may be linear or branched. In certain embodiments, the polymer includes a branched protonated polyethyleneimine. The branched polyethyleneimine may include at least one primary protonated amine moiety, at least one secondary protonated amine moiety, and at least one tertiary protonated amine moiety. In some embodiments, the branched polyethyleneimine includes 15% to 25% primary amine groups, 20% to 50% secondary amine groups, and 10% to 25% tertiary amine groups.

As noted earlier, the polymer further includes an anion. As will be appreciated by one of ordinary skill in the art, the polymer may be formed by forming a salt of an amine group with an acid such that the polymer includes a protonated amine moiety and an anion. In some embodiments, the anion is derived from an acid having a pKa value greater than about 4. Suitable anions may be derived from any acid having a pKa value greater than 1. In some embodiments, the anion is derived from an acid having a pKa value greater than 2. In certain embodiments, the anion is derived from an acid having a pKa value greater than 4.

In some embodiments, the anion is derived from an acid selected from the group consisting of acetic acid, propionic acid, butyric acid, chloroacetic acid, lactic acid, glycolic acid, oxalic acid, malonic acid, phosphoric acid, citric acid, benzoic acid, ascorbic acid, phthalic acid, maleic acid, or combinations thereof. In certain embodiments, the anion is an acetate ion.

The polymer may have a molecular weight depending on its end-use form for separation of the nitrate ions. In some embodiments, the polymer has a molecular weight in a range from about $10^3$ g/mole to about $10^6$ g/mole. In some embodiments, the polymer has a molecular weight in a range from about $10^4$ g/mole to about $10^5$ g/mole.

EXAMPLES

Example 1

Protonation of Polymer

Aqueous solutions of polyethyleneimine (PEI) of two different molecular weights (25 k and 750 k) were titrated with 10% acid aqueous solution to adjust pH to 3.5-4.0. The acids included hydrochloric acid, hydrobromic acid, tetrafluoroboric acid, acetic acid, trifluoroacetic acid and methanesulfonic acid. The solid loading of the resulting polymer aqueous solution was determined by moisture analyzer.

Example 2

Nitrate Removal Tests

The protonated polymer was mixed with potassium nitrate aqueous solutions (443 ppm or 100 ppm) at room temperature for 24 hours. Thereafter, the polymer was separated from the aqueous solution by centrifugal ultrafiltration tubes (MWCO=3000). The filtered solution was measured by UV to determine the concentration of free $NO_3^-$ ions that did not bind to the polymer.

The $NO_3^-$ concentration was determined by measurement of UV absorption at 220 nm. The $NO_3^-$ calibration curve follows Beer's law up to 40 mg/L or 40 ppm $NO_3^-$. The nitrate concentration determined by UV was consistent with the results measured by Ion Chromatography.

Table 1 show the nitrate removal results of polymers protonated with different acids. PEI protonated with acetic acid (pKa~4.76) exhibited up to 81% nitrate removal efficiency, about 7% higher than PEI protonated with hydrochloric acid (pKa~−7) and trifluoroacetic acid (pKa~−0.3).

TABLE 1

Anion Effect on Nitrate Removal Performance of Polyethyleneimine
(Initial Nitrate Concentration = 100 ppm)

| Polymer-MW | Anion | pKa of Acid | Free $NO_3^-$ after filtration (ppm) | Nitrate removal efficiency (%) |
|---|---|---|---|---|
| PEI-25k | $Cl^-$ | −7 | 26.4 | 73.6 |
| PEI-750k | $Cl^-$ | −7 | 25.3 | 74.7 |
| PEI-25k | $Br^-$ | −9 | 32.3 | 67.7 |
| PEI-25k | $BF_4^-$ | −0.4 | 52.1 | 47.9 |
| PEI-25k | $CF_3COO^-$ | −0.3 | 25.7 | 74.3 |
| PEI-750k | $CF_3COO^-$ | −0.3 | 27.3 | 72.7 |
| PEI-25k | $CH_3SO_3^-$ | −2.6 | 21.6 | 78.4 |
| PEI-25k | $CH_3COO^-$ | 4.76 | 19.2 | 80.8 |
| PEI-750k | $CH_3COO^-$ | 4.76 | 18.7 | 81.3 |

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method for removing nitrate ions from a solution, comprising
   (i) providing a polymer comprising:
      a protonated amine moiety; and
      an anion derived from an acid having a pKa value greater than about 1,
         wherein the polymer comprises a linear polymer, and wherein the anion is derived from an acid selected from the group consisting of acetic acid, propionic acid, butyric acid, chloroacetic acid, lactic acid, glycolic acid, oxalic acid, malonic acid, phosphoric acid, citric acid, benzoic acid, ascorbic acid, phthalic acid, maleic acid, and combinations thereof;
   (ii) contacting the polymer with the solution to bind at least a portion of the nitrate ions in the solution with the polymer, and form a polymer-nitrate complex;
   (iii) separating at least a portion of the polymer-nitrate complex from the solution, and
   (iv) separating at least a portion of the nitrate ions from the polymer-nitrate complex to form a regenerated polymer, wherein the separating at least a portion of the nitrate ions from the polymer-nitrate complex comprises introducing the polymer-nitrate complex into a basic aqueous environment and deprotonating the protonated amine moiety.

2. The method of claim 1, wherein the polymer comprises a primary protonated amine moiety, a secondary protonated amine moiety, a tertiary protonated amine moiety, or combinations thereof.

3. The method of claim 1, wherein the polymer comprises a protonated poly(vinyl amine), a protonated poly(4-vinyl pyridine), a protonated polyethyleneimine, a protonated poly(2-(dimethylamino)ethyl methacrylate), a protonated poly(amido amine) dendrimer, or combinations thereof.

4. The method of claim 1, wherein the polymer comprises a protonated polyethyleneimine.

5. The method of claim 1, wherein the anion is derived from an acid having a pKa value greater than about 4.

6. The method of claim 1, wherein the anion comprises an acetate ion.

7. The method of claim 1, wherein the solution comprises an aqueous solution.

8. The method of claim 1, wherein the polymer is in the form of a membrane, a solution, a mixture, a cross-linked gel, an immobilized substrate, a film, a fiber, a powder, a bead, a pellet, or combinations thereof.

9. The method of claim 1, wherein the polymer has a molecular weight in a range from about 103 g/mole to about 106 g/mole.

10. The method of claim 1, wherein the step (iii) comprises removing at least a portion of the polymer-nitrate complex from the solution using an ultrafiltration membrane.

11. A method for removing nitrate ions from a solution, comprising
   (i) providing a polymer comprising: a protonated amine moiety; and an anion derived from an acid having a pKa value greater than about 1, wherein the polymer comprises a linear polymer, and wherein the anion is derived from an acid selected from the group consisting of acetic acid, propionic acid, butyric acid, chloroacetic acid, lactic acid, glycolic acid, oxalic acid, malonic acid, phosphoric acid, citric acid, benzoic acid, ascorbic acid, phthalic acid, maleic acid, and combinations thereof;

(ii) contacting the polymer with the solution to bind at least a portion of the nitrate ions in the solution with the polymer, and form a polymer-nitrate complex;

(iii) separating at least a portion of the polymer-nitrate complex from the solution; and (iv) separating at least a portion of the nitrate ions from the polymer-nitrate complex to form a regenerated polymer, wherein the separating at least a portion of the nitrate ions from the polymer-nitrate complex comprises introducing the polymer-nitrate complex into a basic aqueous environment and deprotonating the protonated amine.

12. The method of claim 1, wherein contacting the polymer with the solution to bind at least a portion of the nitrate ions in the solution with the polymer comprises contacting the polymer with the solution to bind about 60 weight percent to about 90 weight percent of the total amount of nitrate ions in the solution.

* * * * *